(12) United States Patent
Chan et al.

(10) Patent No.: US 7,831,633 B1
(45) Date of Patent: Nov. 9, 2010

(54) METHODS AND APPARATUS FOR IMPLEMENTING A CUSTOM DRIVER FOR ACCESSING A DATA SOURCE

(75) Inventors: Linda Chan, Belmont, CA (US); Peter Lai, Palo Alto, CA (US); Xiaojun Yang, Union City, CA (US); Wenfeng Li, Foster City, CA (US); Paul Rogers, Fremont, CA (US); Alan Li, Foster City, CA (US); Derek Lai, Newark, CA (US)

(73) Assignee: Actuate Corporation, South San Francisco, CA (US)

( * ) Notice: Subject to any disclaimer, the term of this patent is extended or adjusted under 35 U.S.C. 154(b) by 1056 days.

(21) Appl. No.: 11/021,081

(22) Filed: Dec. 22, 2004

(51) Int. Cl.
*G06F 17/30* (2006.01)
*G06F 9/44* (2006.01)

(52) U.S. Cl. ........................ 707/803; 717/105

(58) Field of Classification Search ............ None
See application file for complete search history.

(56) References Cited

U.S. PATENT DOCUMENTS

| | | | | |
|---|---|---|---|---|
| 5,475,836 | A * | 12/1995 | Harris et al. | 707/1 |
| 5,749,079 | A * | 5/1998 | Yong et al. | 707/100 |
| 6,985,901 | B1 * | 1/2006 | Sachse et al. | 707/10 |
| 7,559,066 | B2 * | 7/2009 | Ho et al. | 719/330 |
| 7,562,102 | B1 * | 7/2009 | Sumner et al. | 707/201 |
| 7,574,692 | B2 * | 8/2009 | Herscu | 717/116 |
| 2002/0091702 | A1 * | 7/2002 | Mullins | 707/100 |
| 2002/0104068 | A1 * | 8/2002 | Barrett et al. | 717/104 |
| 2002/0184610 | A1 * | 12/2002 | Chong et al. | 717/109 |
| 2003/0055944 | A1 * | 3/2003 | Belovich | 709/223 |
| 2003/0120624 | A1 * | 6/2003 | Poppenga et al. | 707/1 |
| 2003/0233365 | A1 * | 12/2003 | Schmit et al. | 707/100 |

(Continued)

OTHER PUBLICATIONS

IBM RedBook "A B2B Solution using WbeSphere Business Integration V4.1 and WebSphere Business Connection V1.1" Aug. 2003, authors: Lee Gavin, Gangadhara Rao Akana, Axel Angeli, Sreedhar Reddy Bhumireddy. Pater Gersak, Nizam Ishmael, Hari Kumar Nagumalla, Viral Ved, pp. 27.53, 55, 56, 71, 72, 146, 150, 153, 154, 155, 156, 157, 165, 166, 168, 211.*

*Primary Examiner*—Neveen Abel Jalil
*Assistant Examiner*—Tarek Chbouki
(74) *Attorney, Agent, or Firm*—Weaver Austin Villeneuve & Sampson LLP

(57) ABSTRACT

Methods and apparatus for supporting an additional data source in a system adapted for processing data from one or more data sources are disclosed. A design-time driver for the additional data source is obtained, where the design-time driver supports the definition of data including one or more fields of the additional data source to retrieve from the additional data source. In addition, a run-time driver for the additional data source is obtained, where the run-time driver supports retrieval of data corresponding to the one or more fields from the additional data source and where the run-time driver has a second application programming interface. The design-time driver is executed via a first application programming interface, where the first application programming interface enables definition of the data including the one or more fields to be retrieved from the additional data source. The data is then retrieved from the additional data source via the run-time driver using the second application programming interface.

43 Claims, 11 Drawing Sheets

U.S. PATENT DOCUMENTS

| | | | |
|---|---|---|---|
| 2004/0010776 A1* | 1/2004 | Shah .......................... 717/117 |
| 2004/0064503 A1* | 4/2004 | Karakashian et al. ....... 709/203 |
| 2004/0177060 A1* | 9/2004 | Nixon et al. ................... 707/3 |
| 2004/0204775 A1* | 10/2004 | Keyes et al. .................. 700/29 |
| 2005/0044197 A1* | 2/2005 | Lai ............................ 709/223 |
| 2005/0114378 A1* | 5/2005 | Elien et al. .................. 707/102 |
| 2006/0036941 A1* | 2/2006 | Neil ........................... 715/526 |
| 2006/0150148 A1* | 7/2006 | Beckett et al. .............. 717/109 |
| 2007/0150507 A1* | 6/2007 | Nardone et al. ............. 707/102 |
| 2007/0150546 A1* | 6/2007 | Karakashian et al. ....... 709/207 |

* cited by examiner

Supported Runtime Operations

The primary runtime operations handled by the ODA runtime interface are listed below. An ODA data provider does not have to support all defined features. Optional features are highlighted in the list.

Connection

- Establishes a connection to a data source based on properties defined in name-value pairs
- Obtains information on the capabilities of a data provider
- Commits or rollback any opened transaction on a connection - optional feature Statement
- Creates one, or multiple concurrent, data source specific statements via an opened connection
- Assigns data source specific, runtime properties to a statement - optional feature
- Prepares and validates a query command on a statement; a command syntax is specific to a data source, i.e. not restricted to SQL syntax Parameters - optional feature
- Assigns values to input parameters of a prepared statement
- Obtains the metadata of parameters on a prepared statement, if supported by a data source
- Executes a statement that has no result set and returns output parameters only
- Retrieves the values of output parameters on an executed statement
- Handles scalar and complex input and output parameters, if supported by a data source Cursors or Result Sets
- Handles one or more cursors, or result sets, on a single prepared statement
- Accesses multiple cursors sequentially or concurrently, as supported by a data source
- Accesses a cursor by name, if supported by a data source
- Obtains the metadata of result sets
- Fetches a row of data columns in a sequential, forward direction from an opened cursor
- Sets the limit on the number of rows returned by a statement or a cursor - optional feature.

*FIG. 7*

Output Parameters

Defines one or more output parameters of the data stream. It is up to the ODA host/consumer to determine how to store the values of an output parameter. For example, eRD normally uses Actuate Basic variables of the Data Source component to store corresponding output parameter values.

Its attributes include:

- Name            *xs:string*. Unique name of an output parameter, as known by the ODA data provider. It might be accessed by name at runtime, if supported by the driver.
- Display Name    *xs:string*. Business name of the output parameter.
- Description     *xs:string*. Optional attribute. A free form strong that provides a more extended description of the parameter.
- Native Type Code  *xs:short*. Native data type code of the parameter, as exposed by the ODA runtime driver. The mapping to valid ODA data types is specified as part of the configuration/registration of an ODA data provider. An ODA Consumer, like eRD, can use its value to look up its corresponding set of valid Actuate Basic types. A value of 0 means unknown native data type, and is thus mapped to the ODA String type by default.
- Native Type Name  *xs:string*. Display name of the native data type. It is used for display only.
- Record Definition  *xs:ArrayOfOutputField Definition*. The definition of each field in a complex parameter. It does not apply if the parameter is of a scalar type. eRD supports scalar and Structure complex output parameters only.

*FIG. 8*

- Name  xs:string. Name of a result set, which might be accessed by name at runtime. Its value can be an empty string for those data streams that do not access a result set by name. A non-empty value must be unique within a data stream.
- Result Set Columns  actu:ArrayOfResultColumn. A collection of data columns found in each row of a result set.

Result Column

- Name  xs:string. External unique name of a data row column. It is the name recognized by the runtime driver, and used as identifier, e.g. for sort and filter columns. Note: this is not necessarily the same name used internally by the consumer, such as an Actuate Basic variable name.
- Position  xs:unsignedShort. The 1-based index position (left-to-right order) of a column within the result set, as defined by the ODA provider, and expected at runtime. The sequence of the columns defined in this definition could be in any order, i.e. does not necessarily represent the actual position of a column found in a result set. Furthermore, not all columns need to be exposed or defined in a result set definition. Thus, there could be gaps in a result set's column Position values.
- Display Name  xs:string. Business name of a column, to be used as default column label, and as reference name in a data control's value expression.
- Native Type Code  xs:short. Native data type code of a column, as exposed by the ODA runtime driver. A Consumer, like eRD, can use its value to look up its corresponding set of valid Actuate Basic types. A value of 0 means unknown data type.

*The mapping to valid (default and alternate) ODA data types is specified as part of the configuration/registration of an ODA data provider.*

- Native Type Name  xs:string. Display name of the native data type. It is used for display in UI tools.
- Display Length  xs:short. Default display length of the data value. It is used by eRD to define the default length of corresponding data control. A value of -1 means unknown length.
- Display Format  xs:string. Optional attribute. A string indicating the preferred format to display this data in a report output.

- Horizontal Alignment  Optional attribute. An enumerated value indicating whether by default the column value should be displayed as left, center, right or automatically justified. "Automatically justified" means that it is up to the ODA host or designer to determine the alignment based on its own default rules. The default column alignment value, if not specified, is "Automatic".

*FIG. 9A*

- Heading          *xs:string*. Optional attribute. A free from string that identifies a column in a column header. That is, it should be compact.

- Description      *xs:string*. Optional attribute. A free form string that provides a more extended description of the column.

- Help Text        *xs:string*. Optional attribute; a.k.a. Balloon help. A free form string that provides additional information to the user about this column, particularly when selecting a value for a filter condition.

- Lineage          *xs:string*. Optional attribute. A free-form string that names the original source of the column value. It does not apply to derived value. This info is more for "diagnosis" so a user can get more context info on where a column comes from in the underlying data source.

- Axis             Optional attribute. Applicable when a column is retrieved from a multi-dimensional data source. It contains 2 attributes, describing its corresponding axis metadata info.

- AxisType     Its values are one of "Dimension Member", "Dimension Attribute" or "Measure". This information is used by Information Objects to give users (and applications) information about how the column should be used.

- OnColumnLayout   Optional attribute. A hint on how this column should be layout in a report output, e.g. layout on column or on row. This information is used by presentation controls such as a Crosstabs to present a default layout.

*FIG. 9B*

Design Session Request

The design time interface data that an ODA host/consumer would pass to an ODA data designer at the start of a design session.

- Session Locale
  *enumeration value:* see valid values in the XML Schema section below. The client locale of the primary designer, such as eRD. For exmaple, if eRD is running in Japanese locale, the DS Builder would honor it, and uses the same locale in its own design session as well. It is up to individual DS Builder whether it can support and honor the suggested locale.

- Session Edit Mode
  *enumeration value:* see valid values in the XML Schema section below. Specifies whether the design request session should be in an "editable" or "read-only" mode. This is an optional element, with "editable" as the default. In a read-only mode, an ODA consumer would reject any changes found in the subsequent design session Response. It is up to individual ODA provider on whether to honor the requested read-only mode, and adjusts the behavior of its UI tool. This is a nice-to-have feature to prevent a user from making changes in an ODA design tool, but then not able to reflect the changes in the ODA consumer's report design.

- External Design State
  Provides the state of the last design session to the DS Builder, which had formatted related info and returned in the last Session Response. This is an optional interface element; it is applicable only in a previously defined data stream. See the Session Response section for its detail content.

- Public Connection Properties
  *actu:ArrayOfProperty.* Its initial value might already be collected, and is passed to the DS Builder to establish its own connection, and modify as appropriate. See earlier section for its detail content.

- Private Connection Properties
  *actu:ArrayOfProperty.* Its initial value might already be collected, and is passed to the DS Builder to establish its own connection, and modify as appropriate. See earlier section for its detail content.

- Data Stream Definition
  Properties of a defined data stream. It is passed to a DS Builder for viewing or further modification. It is applicable only in a previously defined data stream component. See earlier section for its detail content.

*FIG. 10*

Design Session Response

The design time interface data that an ODA data designer would return to the ODA host/consumer at the end of a design session.

- Response State — *enumeration value: Ok, UserCancelled, LoginFailed.* This tells the ODA consumer, such as eRD, how to proceed after a DS Builder exits. *Ok* indicates the DS Builder session was successful, and eRD should consume and save the related info provided into the Session Response. *UserCancelled* indicates that user has aborted the DS Builder session. Do not modify and of the previously defined data stream. *LoginFailed* indicates the DS Builder is not able to establish connection using the connection properties provided in the Session Request. A consumer like eRD wizard should then return to the Connection wizard page. If a consumer does not provide a general means to collect connection properties, it will be handled as *User Cancelled.*

- External Design State — Specifies the private state of the DS Builder's design session when it last exits. This is an optional interface element. The DS Builder determines the format of its content, and uses it to resume the state of its last session. ODA framework handles it as a "black-box" stream of persistent data, which is passed back to the DS Builder in the next session request.

- Version — *xs:string.* The version of the external state's data format.
  - State Info — Private data formatted by the DS Builder to describe the state of its last design session. It can be in either *xs:string or xs: base64binary.*
  - Public Connection Properties — See earlier section for its detail description.
  - Private Connection Properties — See earlier section for its detail description.
  - Data Stream Definition — See earlier section for its detail description.

*FIG. 11*

METHODS AND APPARATUS FOR IMPLEMENTING A CUSTOM DRIVER FOR ACCESSING A DATA SOURCE

BACKGROUND OF THE INVENTION

The present invention relates to implementing a custom driver to access data from a corresponding data source and, more specifically, to implementing a design-time and run-time component of a custom driver to access data from a corresponding data source.

Many systems require access to data. For instance, systems such as reporting systems obtain data from various data sources. Typically, reporting systems that are sold to customers include interfaces to commonly used data sources via packaged applications. In this manner, a customer may access data that has been stored in these data sources.

Unfortunately, customers often wish to access data in data sources that are not supported by the software they have purchased. This generally requires extensive coding by the customer to access the data in these additional data sources.

In view of the above, it would be beneficial if a customer could more easily access data from data sources that are not supported by a particular application.

SUMMARY OF THE INVENTION

The present invention enables a custom driver to be invoked to access data from any data source. This is accomplished, in part, via a design-time component and a run-time component of the custom driver. In this manner, a customer may retrieve data from any data source, regardless of whether it was originally supported by the system.

In accordance with one aspect of the invention, methods and apparatus for supporting an additional data source in a system adapted for processing data from one or more data sources include obtaining a driver (e.g., run-time driver) for the additional data source. The driver is executed via an application programming interface associated with the driver, wherein a format of the application programming interface is pre-defined. The driver enables data corresponding to a data definition to be retrieved from the additional data source.

In accordance with another aspect of the invention, methods and apparatus for supporting an additional data source in a system adapted for processing data from one or more data sources include obtaining a design-time component such as an executable file for the additional data source, the executable file supporting creation of a data definition of data including one or more fields of the additional data source to retrieve from the additional data source. In addition, a run-time component such as one or more libraries for the additional data source are obtained, where the libraries support retrieval of data corresponding to the one or more fields from the additional data source. The executable file is executed via a first application programming interface, wherein the first application programming interface of the executable file enables a data definition of the data to be retrieved from the additional data source to be generated or obtained. The data corresponding to the one or more fields is then retrieved from the additional data source using a second application programming interface and the one or more libraries.

In accordance with yet another aspect of the invention, methods and apparatus for supporting an additional data source in a system adapted for processing data from one or more data sources include obtaining a design-time driver for the additional data source, where the design-time driver supports the definition of data including one or more fields of the additional data source to retrieve from the additional data source, where the design-time driver has a first application programming interface. In addition, a run-time driver for the additional data source is obtained, where the run-time driver supports the retrieval of data corresponding to the one or more fields from the additional data source, where the run-time driver has a second application programming interface. The design-time driver is executed via the first application programming interface, where the first application programming interface enables the definition of the data including the one or more fields to be retrieved from the additional data source to be generated or obtained. The data is then retrieved from the additional data source via the run-time driver using the second application programming interface.

In accordance with yet another aspect of the invention, methods and apparatus for supporting an additional data source in a system adapted for processing data from one or more data sources include obtaining a design-time driver for the additional data source, the design-time driver supporting definition of data including one or more fields of the additional data source to retrieve from the additional data source. In addition, a run-time driver for the additional data source is obtained, where the run-time driver supports the retrieval of data corresponding to the one or more fields from the additional data source. The design-time driver is executed via a first set of application programming interfaces, where the first set of application programming interfaces is pre-defined and where the first set of application programming interfaces enables definition of the data to be retrieved from the additional data source. The data is then retrieved from the additional data source using a second set of application programming interfaces, where the second set of application programming interfaces is pre-defined.

In accordance with yet another aspect of the invention, a system adapted for processing data from a plurality of data sources includes a data processor and a set of one or more drivers, each of the drivers having a driver interface, and each of the drivers being capable of generating a data definition defining data to be retrieved from an associated data source and being capable of retrieving the data defined by the data definition from the associated data source. The system also includes a driver receiving mechanism for receiving a new driver and adding the new driver to the set of one or more drivers and includes a driver calling mechanism configured to call a selected one of the drivers via the corresponding driver interface. In addition, the data processor is configured to process the data retrieved from the data source associated with the selected driver.

These and other features of the present invention will be presented in more detail in the following detailed description of the invention and the associated figures.

BRIEF DESCRIPTION OF THE DRAWINGS

FIG. 7 is a diagram presenting exemplary operations that may be performed by a run-time driver via a run-time interface.

FIG. 8 is a diagram presenting exemplary output parameters of a data definition generated by a design-time driver.

FIG. 9 is a diagram presenting a result set definition generated by a design-time driver.

FIG. 10 is a diagram presenting an exemplary design session request.

FIG. 11 is a diagram presenting an exemplary design session response.

DESCRIPTION OF THE PREFERRED EMBODIMENTS

The described embodiments enable a customer to load, select, and invoke a custom driver. In accordance with various embodiments of the invention, the custom driver includes a design-time component and a run-time component. The design-time and run-time components may be implemented in the same driver or separate drivers. Through the custom driver, the customer may access data from any data source. Specifically, the design-time component enables the customer to define a data definition defining the data to retrieve from the data source, while the run-time component enables the data corresponding to the data definition to be retrieved from the data source. In this manner, the customer may access data from any data source, regardless of whether it was originally supported by the system.

Figure 1:
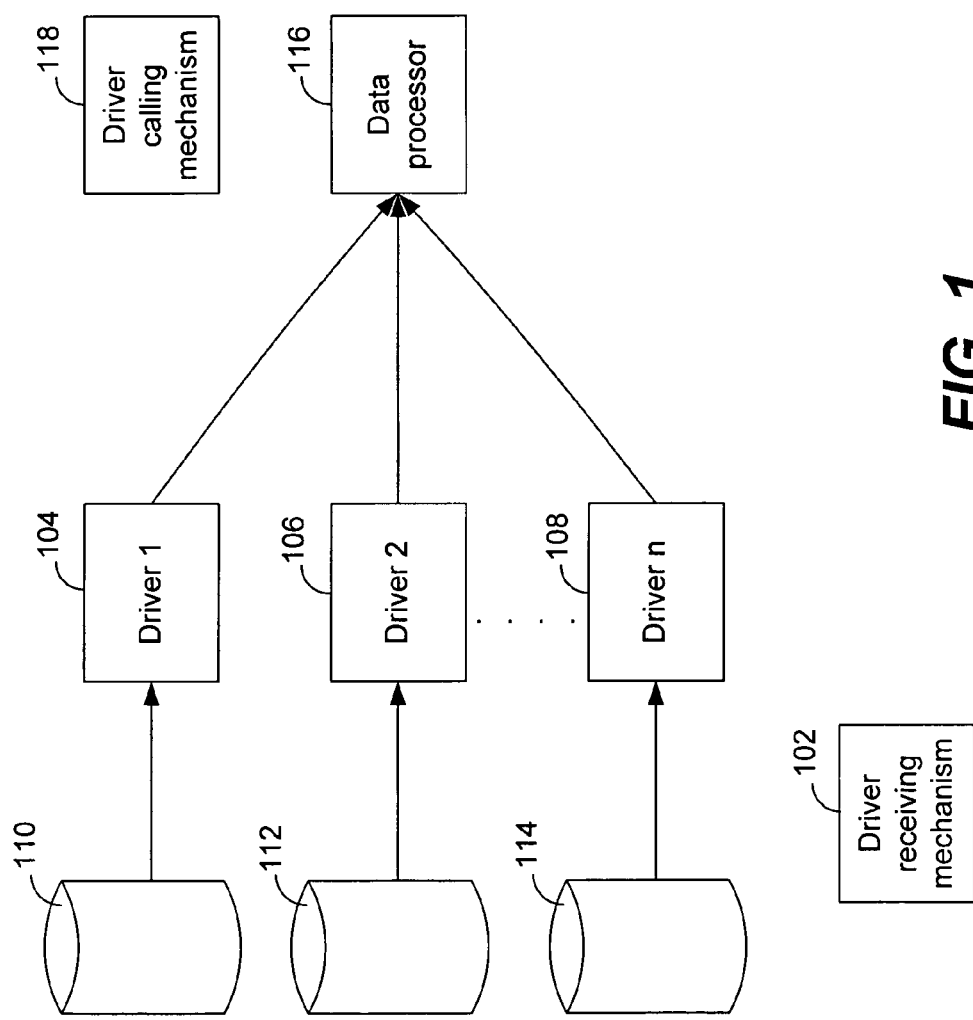
FIG. 1 is a diagram illustrating a system in which the present invention may be implemented to enable customers to install and use custom drivers.

FIG. 1 is a diagram illustrating a system in which the present invention may be implemented to enable customers to install and use custom drivers. As shown in FIG. 1, a driver receiving mechanism 102 is configured to receive a new driver and add the new driver to a set of one or more drivers 104, 106, 108. Each of the drivers 104, 106, 108 is capable of generating a data definition defining data to be retrieved from an associated data source 110, 112, 114, respectively, and being capable of retrieving the data defined by the data definition from the associated data source.

Each of the drivers 104, 106, 108 has a driver interface or a set of driver interfaces. The interface may simply include the name of the driver, enabling the driver to be executed. Alternatively, the interface may include a number of parameters, such as a set of input parameters and/or output parameters. Moreover, the interface may include a call to each of a set of procedures (e.g., supported design-time or run-time operations) to be implemented in the driver. In addition, a set of specifications may be provided to ensure that a particular set of procedures is implemented in the driver, regardless of whether the interface includes a call to these procedures. In other words, the format of the driver and/or the driver interface may be, pre-defined to include a supported set of procedures and/or supported parameters.

In accordance with one embodiment, the interface of the driver or format thereof is pre-defined to enable the customer to create a custom driver that will interface with the underlying system. Thus, the interface of each of the custom drivers may have the same format. Of course, the format may include required parameters, as well as optional parameters. These required and optional parameters may be provided to the customer in the form of driver interface specifications. For instance, XML schema for each of the driver interfaces may be provided to the customer. As a result, even though the interface of each of the custom drivers may have the same format, the interface of each of the custom drivers will differ depending upon the value of the required parameters, as well as the optional parameters that are implemented.

An application programming interface (API) may be pre-defined using a pre-defined set of data types. For instance, the pre-defined data types may include scalar data types such as integer, string, double, date (e.g., including a time portion, up to seconds), time (e.g., no date portion), timestamp (e.g., similar to date, but includes up to nano-seconds), and decimal. The pre-defined data types may also include complex data types such as various data structures. For instance, a complex data type may include a data structure including a single row or collection of data fields, or a table including one or more homogenous rows of data fields, where each field is a scalar data type. If these data types used in the API are different from those in the driver, these data types are mapped to the internal data types used in the driver.

Through the use of a custom driver, data may be retrieved from any data source for use, by a data processor 116. For instance, the data source may be an XML, SAP or other data source. Specifically, a driver calling mechanism 118 is configured to call a selected one of the drivers via the corresponding driver interface (e.g., upon selection of one of the drivers). The driver calling mechanism 118 may be implemented in the data processor 116, or separately from the data processor 116. The data processor 116 is configured to process the data retrieved from the data source associated with the selected driver. For instance, the data processor 116 may include a report generation module for generating a report from the retrieved data. As another example, the data processor 116 may be a spreadsheet designer for generating a spreadsheet from the retrieved data.

As set forth above, the data processor 116 such as a report generation module processes the retrieved data. In accordance with one embodiment, the report generation module incorporates the data definition that has been generated into the report executable. This may be accomplished via a design-time interface of a design-time component or driver. The data may then be retrieved from the data source upon execution of the report executable, which may be accomplished via a run-time interface of a run-time component or driver. Thus, the data processor or report executable may call both the design-time component or driver via the design-time interface and the run-time component or driver via the run-time interface.

Figure 2:
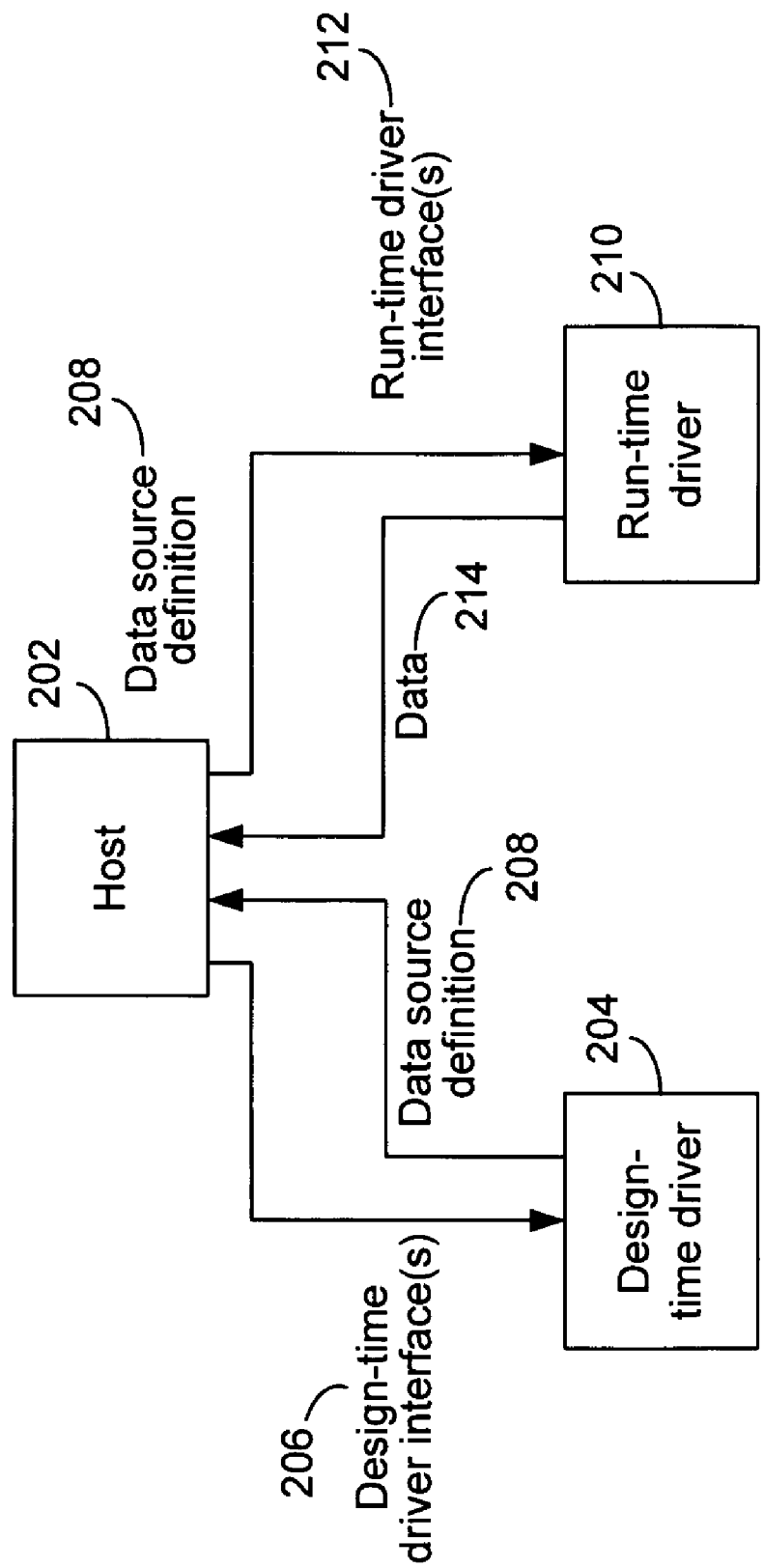
FIG. 2 is a diagram illustrating a general architecture in which a separate design-time and run-time driver are implemented.

FIG. 2 is a diagram illustrating a general architecture in which a separate design-time and run-time driver are implemented. As shown, a host 202 is configured to call a design-time driver 204 via a design-time driver interface 206. The design-time driver 204 generates a data definition (i.e., data source definition) 208 that identifies data including one or more fields of an associated data source to retrieve from the data source. The data definition 208 may also identify one or more columns and/or rows, as well as associated tables, or other data structures, as appropriate. The design-time driver 204 may also be capable of establishing a connection to its corresponding data source, as appropriate, in order to obtain the relevant metadata and/or assist the user to define or modify a data definition 208. For instance, the metadata that may be obtained from the data source may include a display format, horizontal alignment, heading, description, or column layout. In this example, the data definition is provided to the host 202. The data definition 208 may then be provided to a run-time driver 210 (e.g., by the host 202) via a run-time driver interface 212. The design-time driver interface 206 and run-time driver interface 212 may be implemented as set forth above with reference to the driver interface of FIG. 1. Specifically, the format of the APIs, the format of the drivers, and/or the APIs themselves may be pre-defined to ensure that each custom driver conforms to a particular format that can be executed by a host system and/or performs a particular set of procedures or functions. The run-time driver 210 retrieves the data 214 corresponding to the fields from the data source, which may then be provided to the host 202, as shown. The design-time driver 204 and run-time driver 210 may be implemented separately or in combination with one another.

In accordance with one embodiment, the design-time driver 204 includes an executable file and the run-time driver 210 includes one or more libraries. The design-time driver or associated API may enable a user to generate a data definition via a graphical user interface. In this manner, queries against a data source may be defined. The libraries may be Dynamic libraries loaded by the host. The design-time driver may be implemented in any suitable programming language such as Java, C or C++. The design-time driver API may be defined in any suitable programming language, such as XML. The run-time driver API may be defined in any suitable programming language, such as Java or C. The APIs may be defined in a programming language that is independent from the programming language used to generate the corresponding driver(s). Data types may therefore be converted internally within the driver(s), as set forth above.

Figure 3:
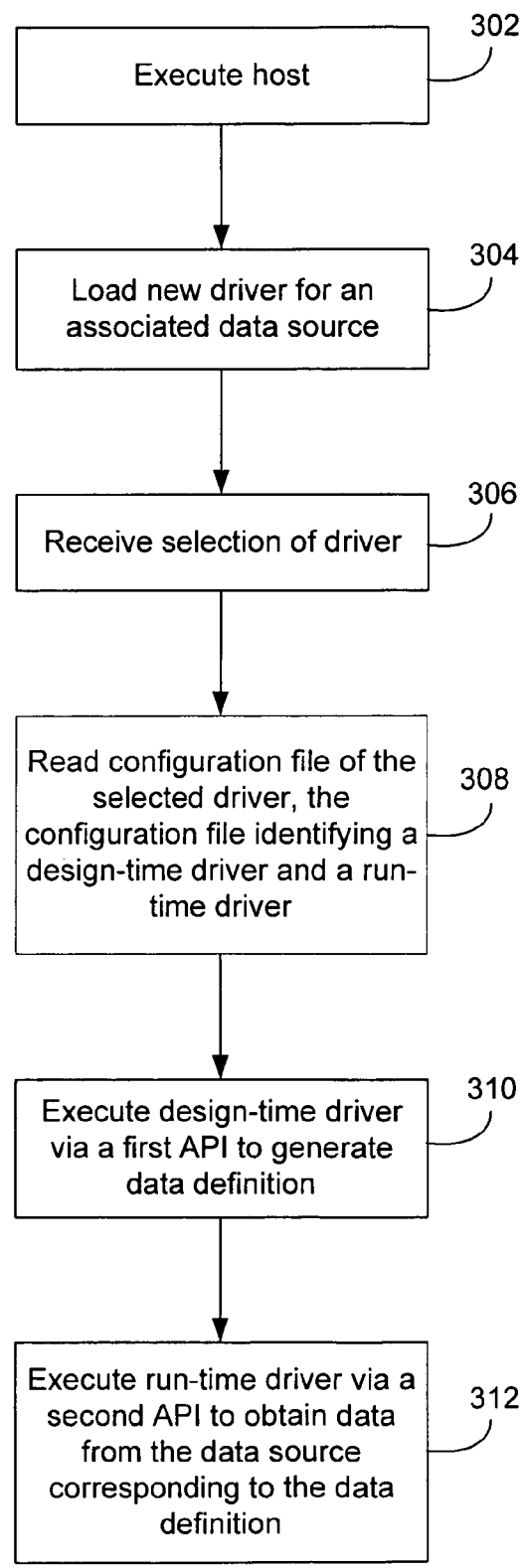
FIG. 3 is a process flow diagram illustrating a method of executing a custom driver in accordance with one embodiment of the invention.

FIG. 3 is a process flow diagram illustrating a method of executing a custom driver in accordance with one embodiment of the invention. A host application is executed at 302. A new driver (e.g., design-time and run-time driver) for a particular data source may be received and loaded (e.g., by the host application) at 304. For instance, the driver may be registered with the host application via a registration process.

In accordance with one embodiment, all drivers are placed under a particular folder (e.g., <Actuate>/oda"). Each driver will have a separate subfolder under this folder. For instance, the driver name may be used as the subfolder name. All driver files may then be stored under this subfolder.

From a set of drivers, a user may select a driver for a particular data source from a list of drivers at 306. Each driver may include a configuration file (e.g., odaconfig.xml) that identifies a design-time driver and a run-time driver. Specifically, the configuration file may include a design-time driver application programming interface (API) (or set of APIs) and a run-time driver API (or set of APIs). Thus, the configuration file of the selected driver is read at 308, thereby enabling the design-time driver and the run-time driver to be executed. Specifically, the configuration file may identify the driver via the driver name, and may identify the design-time interface and the run-time interface, as well as the corresponding data source(s). The design-time driver is executed at 310 via the design-time driver API to generate a data definition defining a query and therefore the data to be retrieved from a particular data source. Specifically, the configuration file may be responsible for executing the design-time driver. In addition, the run-time driver is executed at 312 via the run-time driver API to obtain data from the data source corresponding to the data definition. The run-time driver may also be responsible for opening the data source prior to obtaining the data and closing the data source after the data has been obtained. In this manner, data corresponding to the defined queries may be retrieved.

Figure 4:
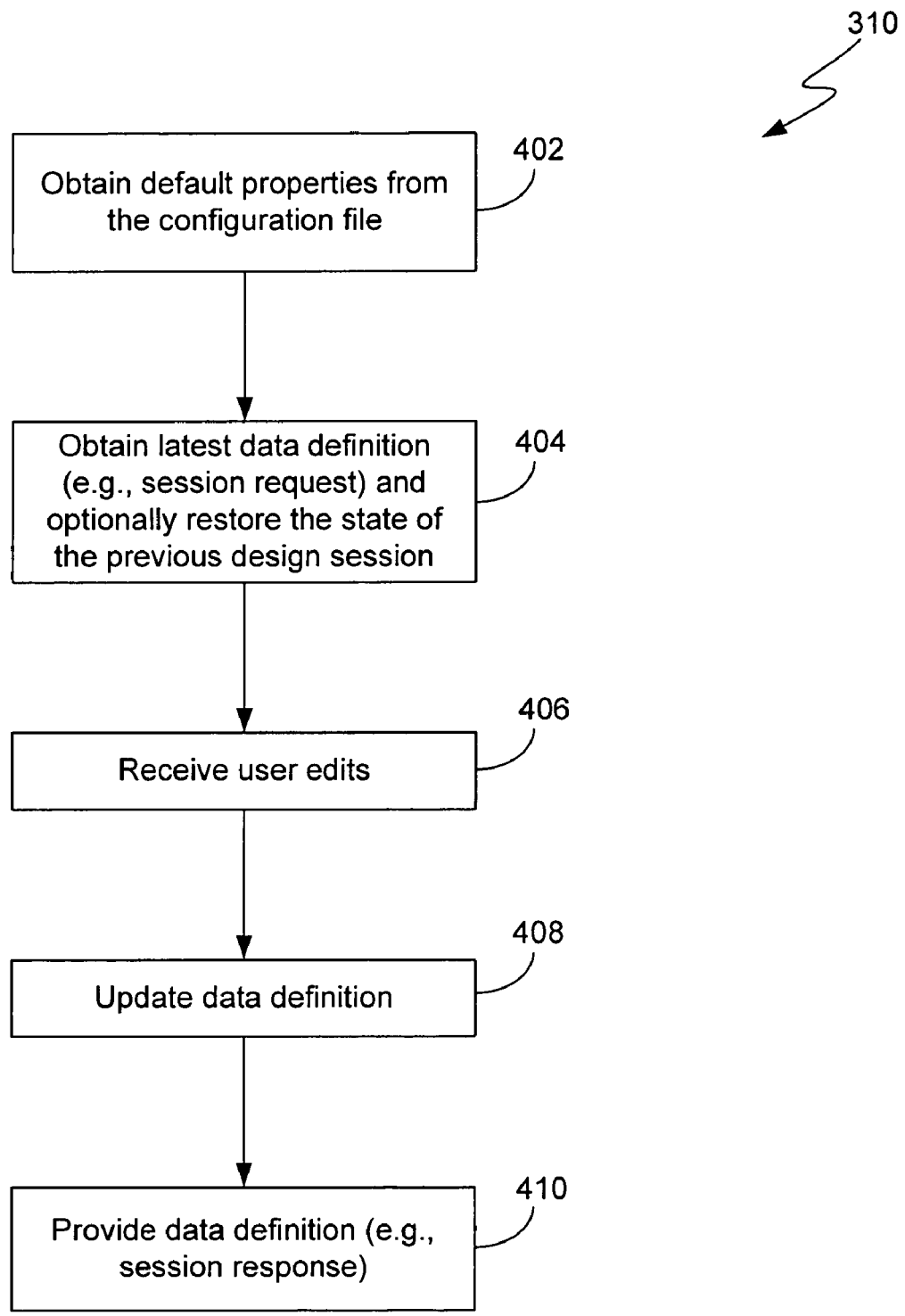
FIG. 4 is a process flow diagram illustrating a method of executing a design-time driver as shown at block 310 of FIG. 3.

FIG. 4 is a process flow diagram illustrating a method of executing a design-time driver as shown at block 310 of FIG. 3 in accordance with one embodiment. A set of default properties may be obtained from the configuration file at block 402. For example, the set of default properties may include a database machine name, database user name, database password, etc. The most current data definition may then be restored from the previous design session at block 404. The user may edit the data definition at block 406, and the data definition is updated accordingly at block 408. The data definition may then be provided to the appropriate module at block 410.

In accordance with one embodiment, the design-time interface includes two components: a Design Session Request interface and a Design Session Response interface. Specifically, the most current data definition may be provided to the design-time driver at block 404 via a Design Session Request interface, while the updated data definition may be obtained from the design-time driver at block 410 via the Design Session Response interface. The Session Request and Response provide the information corresponding to the data definition to enable the host to access the data source. Specifically, the Session Request and Response may each include a name, type, short description, command, and properties, which may include public and/or private properties, as well as input and/or output parameters, a primary result set definition, and metadata which includes information associated with the data. The term "result set definition" is typically used to refer to the core definition of the data to be returned by the run-time driver. Exemplary information that may be included in the result set definition will be described in further detail below with reference to FIG. 9. The name is a string and is the external name of the data source. The type is a string and is the type of the data source. The short description may be a string that includes a short business description of the data source. The command (e.g., query) may be a string that executes at runtime to retrieve the data or perform another command (e.g., write to a data source). For instance, the command may identify one or more parameters (e.g., fields) of a data source, which may be separated by a character such as a colon, as well as the types of each of the parameters (e.g., metadata). For example, the command may be a SQL statement and identify one or more parameters. Public Properties may be specified to identify properties such as database server name, while Private Properties may be specified to identify properties such as a version of a data source. Public Properties may be edited by a user, while Private Properties may be treated as pass-through values. Thus, the public and private properties may be used to identify name-value pairs that can be used to establish a connection to the data source. The information in the Session Response may then be obtained from the design-time driver so that the current data definition can be updated. Similarly, the information in the Session Response can be provided to the run-time driver, thereby enabling data for the current data definition to be retrieved.

In accordance with one embodiment, each input parameter of the Design Session Request interface may be mapped to a parameter of the host 202. In addition, the Design Session Response interface may include one or more output parameters, including a name of an output parameter, a native type code that identifies a native data type (e.g., a data type that is identifiable within the driver and can be mapped to a data type that is identifiable by the host 202), and a record definition that identifies each field in a complex parameter.

Figure 5:
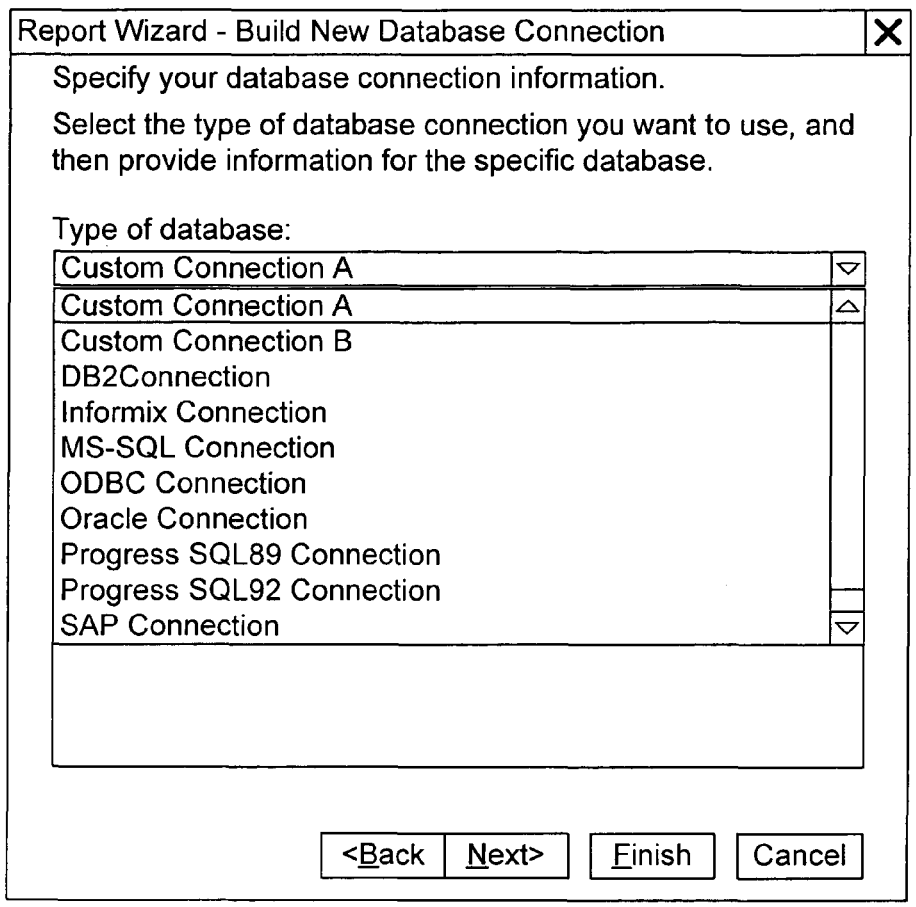
FIGS. 5-6 are exemplary graphical user interfaces for initializing the information associated with the custom driver to be invoked.
Figure 6:
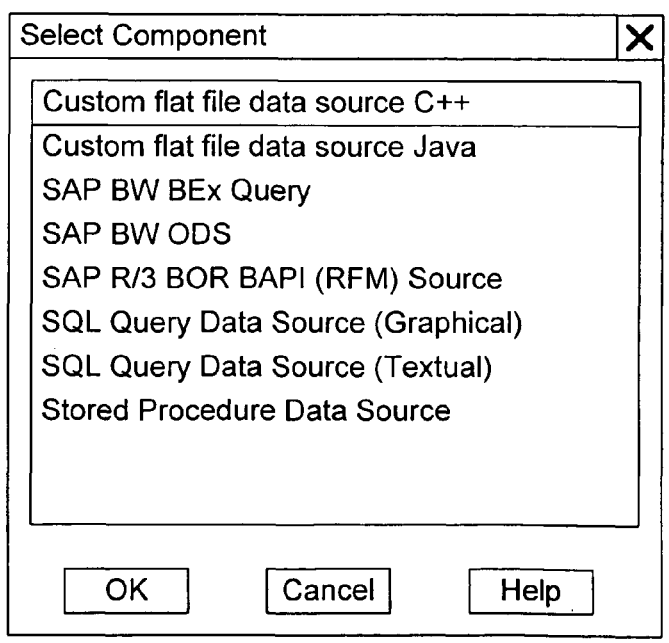

FIGS. 5-6 are exemplary graphical user interfaces for initializing the information associated with the custom driver to be invoked. As shown in FIG. 5, the user may select the data source connection, as well as the data source itself as shown in FIG. 6. The data source connection enables a connection to be established with the specified data source. For instance, the connection between the host/driver and the data source allows the two to communicate, e.g. for the host/driver to send the command to the data source for execution, and for the data source to return data to host/driver according to the command.

The data source connection may be defined in the configuration file under each of the custom driver directories. Thus, when the host reads the configuration files of all the custom drivers, it may present the list of custom connections in the graphical user interface shown in FIG. 5. In this example, the connection and data source are custom, thereby enabling the corresponding driver to be selected. The design-time interface is then invoked.

In accordance with one aspect, a trace logging utility is provided, which enables runtime drivers to be debugged. In order to access this trace logging utility, the configuration file of the driver may indicate that the trace logging utility is to be accessed. For instance, the configuration file may include information such as a log level, log directory, log filename prefix, and/or a Java log formatter provided by the runtime driver. The log level may be used to determine the level of information that should be logged. The log directory identifies the directory where the log file should be written. The log filename prefix may identify a prefix to be used in the filename. The Java log formatter may be optionally specified. If the Java log formatter is not specified, a default log formatter provided by the system may be applied. In this manner, a customer may indicate whether their custom runtime driver invokes the trace logging utility.

As set forth above, a run-time driver may be used to retrieve data from a corresponding data source. FIG. 7 is a diagram presenting exemplary operations that may be performed by a run-time driver via a run-time interface. Each of these operations may be implemented by the run-time driver, and may also be accessed via the run-time interface. In accordance with one embodiment, each of the features should be supported by the run-time driver, while the optional features indicated need not be supported by the run-time driver.

In this example, various exemplary operations are set forth that may be implemented by a run-time driver. Specifically, three connection-related operations are set forth: 1) Establishing a connection to a data source based upon one or more properties, which may be defined in name-value pairs; 2) Obtaining information on the capabilities of a run-time driver, design-time driver, and/or data source; 3) Committing or rolling back any transaction associated with a database or connection to a database. A statement (or command) is what the data source should execute to return the data requested. For instance, the statement may be a SQL statement such as "SELECT column1 FROM table1." Three statement-related operations are set forth: 1) Creating one or multiple concurrent data source specific statements, such as; 2) Assigning data source specific, runtime properties to a statement, such as a request identifier, which enables the data source to include the request identifier in its audit trail, thereby enabling a request in the host application to be correlated with the corresponding data source statement/command; 3) Preparing a query command, where the command syntax may be specific to a particular data source. Five parameter-related operations are set forth: 1) Assigning values to one or more input parameters of a statement; 2) Obtaining metadata of parameters of a statement, if supported by a data source; 3) Executing a statement that has no result set (e.g., that returns no data) and returns only output parameters. For instance, a stored procedure in a Relational Database System may be executed without returning a row of data; 4) Retrieving the values of output parameters; 5) Handling scalar and complex input and output parameters, if supported by a data source. Six operations related to cursors (e.g., context of fetching data from a data source) or result sets are set forth: 1) Handling one or more cursors, or result sets, in a single statement; 2) Accessing multiple cursors, sequentially or concurrently, as supported by a data source; 3) Accessing a cursor by name, if supported by a data source; 4) Obtaining the metadata (e.g., type, etc.) of result sets; 5) Fetching a row of data columns in a sequential, forward direction; 6) Setting the limit on the number of rows returned by a statement or a cursor.

In accordance with one embodiment, the run-time interfaces are modeled after JDBC. Thus, the run-time interfaces may include JDBC capabilities such as those that are suitable for applications such as reporting applications. For instance, these capabilities may include binding parameter values, fetching data for each column of a row, etc. Other capabilities that are not defined in JDBC may also be implemented, such as the access of a result set(s) by name. In addition, complex, non-scalar input and output parameters may be supported, as well as any type of data source. Any query command text (e.g., not limited to SQL statement syntax) may be supported to query a data source. In addition, the same connection may be used to create different types of data-source specific statements. For example, a SAP connection can be used for a SAPBW BEx Query data source, a SAP BW ODS data source and a SAP R/3 BOR BAPI (RFM) data source.

Various output parameters may be defined as output parameters of a data definition. In other words, the output parameters are those that will include data obtained from the data source during run-time. FIG. 8 is a diagram presenting exemplary output parameters of a data definition generated by a design-time driver. For instance, an output parameter may include a name, display name, description, native type code as implemented in the run-time driver. This native type code may then be mapped to a type code supported by the system. An output parameter may also have a native type name and a record definition. A record definition may include a definition of each field in an output parameter.

A result set definition defines a result set. Specifically, a result set is defined via the design-time driver in order to establish the data that is to be returned via the run-time driver. FIG. 9 is a diagram presenting a result set definition generated by a design-time driver. In accordance with one embodiment, a result set is mapped to a row of data. Thus, the result set definition is a named collection of one or more defined data columns. As shown in this example, the result set definition may be identified by a name, and include a set of columns found in each row of a result set. A result column may have a name, position, display name, native type code (e.g., internal to the run-time driver), native type name, display length, display format, horizontal alignment, heading, description, help text, lineage, and axis. Specifically, a lineage names the original data source of the column value, while the term axis refers to a dimension of a multi-dimensional data source. For example, for a multi-dimensional data source that contains sales data, one axis can be "PurchaseDate," while "SalesRegion" can be another axis.

As set forth above, a data definition may be provided by a user or a host application to a design-time driver via a design session request, while an updated data definition may be obtained by a user or a host application from the design-time driver via a design session response. Exemplary design session request and response formats will be described in further detail below with reference to FIGS. 10 and 11.

FIG. 10 is a diagram presenting an exemplary design session request which may be provided to the design-time driver. In this example, the design session request may identify a session locale in order to identify the appropriate language or country. In addition, the design session request may identify a session edit mode. In other words, a user or host may provide an indicator via the first application programming interface to the design-time driver, where the indicator indicates whether the data definition is editable or read-only. In read-only mode, any changes made to the data definition in the design session response would be rejected or ignored, or alternatively, any changes made to the data definition by the user would be prevented entirely. In addition, the design session request may include the external design state, which is the state of the last design session, which may include the last data definition that has been established. The design session request may include public connection properties, as well as private connection properties, as set forth above.

FIG. 11 is a diagram presenting an exemplary design session response that is obtained from the design-time driver at the end of a design session. Specifically, a response state may indicate whether the session was successful, cancelled, or failed. An external design state may indicate the state of the design session when it last exits. In addition, the design session response may include public and/or private connection properties, as well as the data definition, as may have been updated during the design session.

The manipulations of data described herein are often referred to in terms, such as storing, obtaining, providing, or generating. In any of the operations described herein that form part of the present invention, these operations are machine operations. Useful machines for performing the operations of the present invention include general-purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description herein.

Still further, the present invention relates to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A preferred computer system invention includes a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, a mass storage unit, a keyboard, and a clock.

In one embodiment, the CPU is preferably one or more microprocessor chips selected from complex instruction set computer (CISC) microprocessors, reduced instruction set computer (RISC) microprocessors, or other available microprocessors. The CPU is coupled to a memory by a bi-directional data bus, but may also be coupled by a unidirectional data bus in the case of ROM. The memory is also coupled to the CPU by appropriate control and address busses, as is well known to those skilled in the art.

The CPU is coupled to the I/O circuitry by a bi-directional data bus to permit data transfers with peripheral devices. I/O circuitry preferably includes a number of latches, registers and direct memory access (DMA) controllers. The purpose of the I/O circuitry is to provide an interface between CPU and such peripheral devices as display assembly, mass storage (e.g., disks), keyboard, and clients. The display assembly of server receives data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store report templates (e.g., template objects) of this invention, programs for accessing or generating such report templates, programs for viewing such report templates, and programs for generating a report from such report templates.

The keyboard communicates with the CPU via data bus and I/O circuitry. In addition to keyboard, other types of input device can also be used in conjunction with the present invention. For example, a computer mouse, a track ball, a track pad, or a pen-based tablet can be used to manipulate a pointer on display screen. A clock preferably comprises a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices which can access the report templates (e.g., report objects) or report template generating software on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

It is also within the scope of this invention to implement the apparatus and methods for generating a data definition and accessing data corresponding to the data definition from a data source on a "stand-alone" computer that does not form part of a network.

Although the foregoing invention has been described in some detail for purposes of clarity of understanding, it will be apparent that certain changes and modifications may be practiced within the scope of the appended claims. For instance, although the specification has described an example illustrating APIs and procedures implemented via a design-time driver and run-time driver, different types of APIs and procedures may be implemented as well. In addition, the reader will understand that the processes described herein are illustrative only. Thus, the methods, apparatus, and data structures for obtaining data from a data source via a custom driver as disclosed herein may be used with other processes and data structures.

What is claimed is:

1. In a system adapted for processing data from one or more data sources, a computer-implemented method of supporting an additional data source, wherein the system includes a set of design-time drivers and a set of run-time drivers that support access to the one or more data sources but do not support access to the additional data source, comprising:

loading a design-time driver for the additional data source such that the set of design-time drivers includes the design-time driver, the design-time driver supporting definition of data including one or more fields of the additional data source to retrieve from the additional data source, the design-time driver having a first application programming interface that conforms to a first pre-defined format;

loading a run-time driver for the additional data source such that the set of run-time drivers includes the run-time driver, the run-time driver supporting retrieval of data corresponding to the one or more fields from the additional data source, the run-time driver having a second application programming interface that conforms to a second pre-defined format;

executing the design-time driver via the first application programming interface;

wherein the first application programming interface enables the definition of the data including the one or more fields to be retrieved from the additional data source to be generated or obtained;

retrieving the data from the additional data source via the run-time driver using the second application programming interface, wherein each of the set of design-time drivers has a corresponding application programming interface that conforms to the first pre-defined format and wherein each of the set of run-time drivers has a corresponding application programming interface that conforms to the second pre-defined format; and generating a report from the data retrieved from the additional data source.

2. The method as recited in claim 1, wherein executing the design-time driver via a first application programming interface comprises:

receiving an indicator via the first application programming interface, the indicator indicating whether the definition of the data is editable or read-only.

3. The method as recited in claim 1, further comprising:

loading a configuration file identifying the design-time driver and the run-time driver; and reading the configuration file.

4. The method as recited in claim 3, wherein the configuration file identifies at least one of a log level, a log directory, a log filename prefix, or a Java log formatter.

5. The method as recited in claim 1, wherein the format of the first application programming interface includes at least one of a set of input parameters or a set of output parameters.

6. The method as recited in claim 1, wherein the format of the first application programming interface includes at least one of a session locale, external design state, one or more public connection properties, one or more private connection properties, a data stream definition, a command, or a result set definition.

7. The method as recited in claim 1, wherein the format of the design-time driver is pre-defined to generate the data definition.

8. The method as recited in claim 1, where the design-time driver is configured to communicate the data definition to a host system in a supported format.

9. The method as recited in claim 1, wherein the format of the second application programming interface includes a call to each of a set of procedures to be implemented in the run-time driver.

10. The method as recited in claim 1, wherein the format of the run-time driver is pre-defined to include a supported set of procedures.

11. The method as recited in claim 1, further comprising:

generating a report executable using the definition.

12. The method as recited in claim 1, wherein the design-time driver and the run-time driver are created by a customer.

13. The method as recited in claim 1, wherein the first application programming interface and the second application programming interface are pre-defined.

14. The method as recited in claim 1, wherein the design-time driver includes an executable file and the run-time driver includes one or more libraries.

15. The method as recited in claim 1, wherein the design-time driver provides a graphical user interface.

16. The method as recited in claim 1, wherein the second application programming interface is pre-defined to include a set of supported runtime operations.

17. The method as recited in claim 1, wherein the first and second application programming interfaces are pre-defined using a pre-defined set of data types.

18. In a system adapted for processing data from one or more data sources, a method of supporting an additional data source, wherein the system includes a set of design-time drivers and a set of run-time drivers that support access to the one or more data sources but do not support access to the additional data source, comprising:

obtaining a design-time driver for the additional data source and storing the design-time driver for the additional data source such that the design-time driver is included in the set of design-time drivers, the design-time driver supporting definition of data including one or more fields of the additional data source to retrieve from the additional data source;

obtaining a run-time driver for the additional data source and storing the run-time driver for the additional data source such that the run-time driver is included in the set of run-time drivers, the run-time driver supporting retrieval of data corresponding to the one or more fields from the additional data source;

executing the design-time driver via a first set of application programming interfaces, wherein a format of the first set of application programming interfaces is pre-defined and wherein the first set of application programming interfaces enables definition of the data to be retrieved from the additional data source;

retrieving the data from the additional data source using a second set of application programming interfaces, wherein a format of the second set of application programming interfaces is pre-defined; and generating a report from the data retrieved from the additional data source;

wherein a format of a set of application programming interfaces of each of the set of design-time drivers conforms to the format of the first set of application programming interfaces, and wherein a format of a set of application programming interfaces of each of the set of run-time drivers conforms to the format of the second set of application programming interfaces.

19. The method as recited in claim 18, further comprising: loading the design-time driver and the run-time driver.

20. The method as recited in claim 18, wherein the design-time driver and the run-time driver are generated by a customer.

21. The method as recited in claim 18, wherein the first set of application programming interface and the second set of application programming interfaces are pre-defined.

22. The method as recited in claim 18, wherein the design-time driver includes an executable file and the run-time driver includes one or more libraries.

23. The method as recited in claim 18, wherein the first set of application programming interfaces includes a graphical user interface.

24. A system adapted for processing data from one or more data sources, wherein the system includes a set of design-time drivers and a set of run-time drivers that support access to the one or more data sources but do not support access to an additional data source, comprising:
  a processor; and
  a memory, at least one of the processor or the memory being adapted for:
    receiving a design-time driver for the additional data source and loading the design-time driver for the additional data source such that the set of design-time drivers includes the design-time driver, the design-time driver supporting definition of data including one or more fields of the additional data source to retrieve from the additional data source, the design-time driver having a first application programming interface that conforms to a first pre-defined format;
    receiving a run-time driver for the additional data source and loading the run-time driver for the additional data source such that the set of run-time drivers includes the run-time driver, the run-time driver supporting retrieval of data corresponding to the one or more fields from the additional data source, the run-time driver having a second application programming interface that conforms to a second pre-defined format, wherein each of the set of design-time drivers has a corresponding application programming interface that conforms to the first pre-defined format and wherein each of the set of run-time drivers has a corresponding application programming interface that conforms to the second pre-defined format;
    executing the design-time driver via the first application programming interface, wherein the first application programming interface enables the definition of the data including the one or more fields to be retrieved from the additional data source to be generated or obtained;
    retrieving the data from the additional data source via the run-time driver using the second application programming interface; and
    generating a report from the data retrieved from the additional data source.

25. The system as recited in claim 24, wherein executing the design-time driver via the first application programming interface comprises:
  receiving an indicator via the first application programming interface, the indicator indicating whether the definition of the data is editable or read-only.

26. The system as recited in claim 24, at least one of the processor or the memory being further adapted for:
  loading a configuration file identifying the design-time driver and the run-time driver; and
  reading the configuration file.

27. The system as recited in claim 26, wherein the configuration file identifies at least one of a log level, a log directory, a log filename prefix, or a Java log formatter.

28. The system as recited in claim 24, wherein the format of the first application programming interface includes at least one of a set of input parameters or a set of output parameters.

29. The system as recited in claim 24, wherein the format of the first application programming interface includes at least one of a session locale, external design state, one or more public connection properties, one or more private connection properties, a data stream definition, a command, or a result set definition.

30. The system as recited in claim 24, wherein the format of the design-time driver is pre-defined to generate the data definition.

31. The system as recited in claim 24, where the design-time driver is configured to communicate the data definition to a host system in a supported format.

32. The system as recited in claim 24, wherein the format of the second application programming interface includes a call to each of a set of procedures to be implemented in the run-time driver.

33. The system as recited in claim 24, wherein the format of the run-time driver is pre-defined to include a supported set of procedures.

34. A computer-readable storage medium storing thereon computer-readable instructions that, when executed, cause a processor to support access to an additional data source in a system adapted for processing data from one or more data sources, wherein the system includes a set of design-time drivers and a set of run-time drivers that support access to the one or more data sources but do not support access to the additional data source, comprising:
  instructions for receiving a design-time driver for the additional data source and loading the design-time driver for the additional data source such that the set of design-time drivers includes the design-time driver, the design-time driver supporting definition of data including one or more fields of the additional data source to retrieve from the additional data source, the design-time driver having a first application programming interface that conforms to a first pre-defined format;
  instructions for receiving a run-time driver for the additional data source and loading the run-time driver for the additional data source such that the set of run-time drivers includes the run-time driver, the run-time driver supporting retrieval of data corresponding to the one or more fields from the additional data source, the run-time driver having a second application programming interface that conforms to a second pre-defined format, wherein each of the set of design-time drivers has a corresponding application programming interface that conforms to the first pre-defined format and wherein each of the set of run-time drivers has a corresponding application programming interface that conforms to the second pre-defined format;
  instructions for executing the design-time driver via the first application programming interface, wherein the first application programming interface enables the definition of the data including the one or more fields to be retrieved from the additional data source to be generated or obtained;

instructions for retrieving the data from the additional data source via the run-time driver using the second application programming interface; and instructions for generating a report from the data retrieved from the additional data source.

35. The computer-readable storage medium as recited in claim 34, wherein the instructions for executing the design-time driver via the first application programming interface comprises:

instructions for receiving an indicator via the first application programming interface, the indicator indicating whether the definition of the data is editable or read-only.

36. The computer-readable storage medium as recited in claim 34, further comprising:

instructions for loading a configuration file identifying the design-time driver and the run-time driver; and reading the configuration file.

37. The computer-readable storage medium as recited in claim 36, wherein the configuration file identifies at least one of a log level, a log directory, a log filename prefix, or a Java log formatter.

38. The computer-readable storage medium as recited in claim 34, wherein the format of the first application programming interface includes at least one of a set of input parameters or a set of output parameters.

39. The computer-readable storage medium as recited in claim 34, wherein the format of the first application programming interface includes at least one of a session locale, external design state, one or more public connection properties, one or more private connection properties, a data stream definition, a command, or a result set definition.

40. The computer-readable storage medium as recited in claim 34, wherein the format of the design-time driver is pre-defined to generate the data definition.

41. The computer-readable storage medium as recited in claim 34, where the design-time driver is configured to communicate the data definition to a host system in a supported format.

42. The computer-readable storage medium as recited in claim 34, wherein the format of the second application programming interface includes a call to each of a set of procedures to be implemented in the run-time driver.

43. The computer-readable storage medium as recited in claim 34, wherein the format of the run-time driver is pre-defined to include a supported set of procedures.

* * * * *